United States Patent [19]

Kuenzig et al.

[11] 4,234,299
[45] Nov. 18, 1980

[54] BLOW PIN CONSTRUCTION IN A PLASTIC BOTTLE BLOW MOLDING MACHINE

[75] Inventors: Ernest O. Kuenzig, Glen Head; Frank L. Pennino, Farmingdale, both of N.Y.

[73] Assignee: Forest Mechanical Products Corp., Kew Gardens, N.Y.

[21] Appl. No.: 49,914

[22] Filed: Jun. 19, 1979

[51] Int. Cl.³ .................... B29C 17/07; B29C 17/10
[52] U.S. Cl. .................................. 425/292; 264/533; 425/525; 425/527; 425/535; 425/457
[58] Field of Search ............... 425/525, 535, 292, 527, 425/457, 468; 264/533

[56] References Cited

U.S. PATENT DOCUMENTS

| | | | |
|---|---|---|---|
| 3,101,901 | 8/1963 | Britten | 425/535 X |
| 3,597,793 | 8/1971 | Weiler et al. | 425/525 X |
| 4,032,278 | 6/1977 | Kuenzig et al. | 425/525 |

Primary Examiner—Jan H. Silbaugh
Attorney, Agent, or Firm—Eliot S. Gerber

[57] ABSTRACT

A plastic bottle is formed by extruding a hot plastic parison around a blow pin within a two-part mold. The mold is closed and sealed and the parison is expanded by air pressure against the cooled internal wall of the mold. Each mold half at its top neck carries a sealing assembly which seals against the blow pin. The blow pin is cooled by the air pressure and has an elongated lower tubular portion with air holes which are slanted upwardly to form a selected blow air pattern to aid in forming the handle portion of the bottle.

9 Claims, 6 Drawing Figures

BLOW PIN CONSTRUCTION IN A PLASTIC BOTTLE BLOW MOLDING MACHINE

BACKGROUND OF THE INVENTION

The present invention relates to plastic blow molding machines.

One of the method presently used to produce plastic resin containers, such as milk bottles, is called "blow molding." That process is widely used in the dairy industry to produce one-half gallon and one-gallon bottles from high density polyethylene, a thermoplastic resin. Generally such plastic molded bottles have an integral hollow handle to permit the filled bottles to be easily handled by shoppers and consumers.

In the blow molding process the plastic material, for example, polyethylene pellets, is placed in a hopper and the hopper leads to an extrusion screw. The screw applies pressure or heat and pressure, causing the pellets to melt and flow in the form of a viscous semi-fluid mass. The semi-fluid plastic is forced to flow around a mandrel and through an extrusion die orifice which shapes it into an elongated thin-walled tube called a "parison".

The parison, having just been forced from the extruder, is hot; for example, it may be about 350° F. The parison is positioned around a blow tube and within an opened two-part mold. The mold is closed and its sealing members seal the top and the bottom of the parison to form an air-tight unit. Air is then blown through the blow tube and into the interior of the parison, causing the parison to expand against the inner walls of the mold. The walls of the mold are cooled by circulating a stream of fluid using an outer jacket surrounding the mold face. The cold walls of the mold cool the resin and form the parison, for example, into a bottle. The air is then exhausted and the two mold halves are opened.

The mold is constructed in two halves which must be brought together quickly and in exact alignment in order to prevent escape of air. At the top of the mold there is most often a "neck ring". The mold will form the body of the bottle and "flashing", usually at the top and bottom of the bottle. Since the opposite walls of the parison are hot and collapse together under pressure, they may coalesce to form the sheet-like flashing. The flashing consists of the collapsed opposite walls of the parison tube which have been brought together and which must subsequently be trimmed off from the bottle.

After the bottle is formed, the two mold halves are opened and the bottom flashing may be used to pull the bottle out of the mold and remove the formed bottle from around the blow pipe. The bottles may be removed by machine fingers (metal snap members) which reach up and grab the bottom flashing (tail). The fingers pull the bottle down onto a conveyor belt which takes the bottles to subsequent machines in which the flashing is removed.

In a typical blow molding machine, as a timing method, the extrusion screw at its forward point hits a limit switch. That switch causes a compressed air blast of low air pressure (for example, 45 pounds) for 2/10 to 3/10 of a second through the blow pin in order to slightly blow (expand) the parison before the mold is closed. This is called a "pre-blow." For example, the parison for a 6-inch diameter bottle may be expanded to 3 inches. The mold is then closed and sealed and a blast of high pressure air (for example, 80 pounds) is expelled through the blow pin to expand the parison to the interior mold wall to form the bottle. The formed bottle is cooled by the cold mold wall for 3 to 5 seconds. The blow pin is then automatically pulled upwardly, for example, for a travel of ½ inch, to shear the bottle neck and form a round hole.

An example of a blow molding machine is the "UNILOY" (TM) Model 350R2, which is made by Hoover Ball and Bearing Company and may be equipped with four, six, eight, ten or twelve heads (molds). When equipped with six heads to make milk and juice gallon containers (less than 65 gram gallon size) it may make 2400 or more containers an hour.

From time to time there have been certain problems with this type of blow molding machine when a "pre-finish" neck is utilized, i.e., a neck formed by a shearing action in the mold. When the mold parts are closed, a sealing and shearing member is moved into a cylindrical hollow on the blow pin, leaving a gap filled by the plastic parison, to form a seal using the parison. The blow pin is the sealing neck member attached to the blow pipe and is moved axially upwards to shear the plastic of the neck by forcing it against the shearing and sealing member which remains level.

The blow pin is supported only by the blow pipe and is not supported at its bottom end. The blow pipe is a lengthy tube which carries the compressed air and is under thermal stress because it is surrounded by a fast-moving hot tube of formed plastic.

The non-centering or non-exact alignment of the blow pin may cause difficulties because the mold is closed under great pressure. If the blow pin has been misaligned, the sealing and shearing member, called shear steels or shear rings, which meet the blow pin, may strike it with great force and may damage the blow pin. More frequently, such contact may damage or cause undue wear or stress on the shear steels. On the other hand, in order to improve the air blow pattern, users will sometimes deliberately misalign the blow pin and/or molds, which results in the blow pin being struck on each mold closure by the shear steels.

The plastic parison acts as a lubricant and prevents wear which might otherwise occur between the metal members. However, in the event of non-exact alignment between the shearing member and the blow pin, the plastic may become too thin, causing holes. If there is a hole, it will permit escape of the compressed air upon the compressed air stroke, resulting in a deformed or non-formed bottle.

There is presently being sold a "UNILOY" (TM of Hoover Ball and Bearing Company) blow pin called "Ring Of Air" (TM) in which air is expelled from an open channel, i.e., a "ring" opening, which is formed between a bottom outwardly extending flange of an inner cylindrical sleeve member and the skirt (bottom of hollow cylindrical portion) of the outer cylindrical wall portion, below the shearing-cutting edge. The parts of the blow pin are held together by a top split ring and a bottom nut. However, under the heavy and repeated striking forces of mold closing, when the shear steels hit the blow pin the nut may become loosened and the blow pin may thereby become out of alignment or even fall apart. The "UNILOY" (TM) blow pin sometimes produces faulty plastic containers in which the handle is not formed, or the handle has a "web", an undesired plastic piece in the handle. The handle webbing may partially or entirely close the handle, making the bottle difficult to fill or resulting in a partially unfilled bottle because there is no fluid (milk, juice, etc.) in the handle.

The "pre-finish" neck type of flow molding machine is generally described in U.S. Pat. No. 3,369,272; and U.S. Pat. No. 3,470,582 describes a somewhat similar machine. Both of these patents are assigned on their faces to Hoover Ball and Bearing Company, who manufactures the "UNILOY" (TM) blow molding machine. In U.S. Pat. No. 3,369,272 an "annular shearing edge 70" of "portions 68 of the mold sections 60" is used for sealing and shearing the neck of the formed plastic resin bottle; and that process is illustrated in its FIGS. 2 and 3. That patent describes the blow pin as having a head with a stepped construction. In U.S. Pat. No. 3,470,582 the "mold cavity neck portion 68" is used for separation of the parison.

In U.S. Pat. No. 3,869,237 an alternative apparatus to a movable blow pin is used to cut off the container neck, this patent showing a trim knife for that purpose.

OBJECTIVES AND FEATURES OF THE INVENTION

It is an objective of the present invention to provide a blow pin construction for a plastic bottle blow molding machine which will provide a blow of air of sufficient force and accuracy so that all portions of the bottle will be accurately formed, including the normally difficult to form integral handle portion, which is especially difficult to form in lightweight bottles, i.e., one gallon bottles of less than 65 grams.

It is another objective of the present invention to provide a blow pin construction for a plastic bottle blow molding machine which will enable the blow molding machine to be operated at a relatively higher speed due to a faster air flow and air exhaust cycle, resulting in a savings in labor, overhead and capital cost for each bottle produced by the machine.

It is a further objective of the present invention to provide a blow pin construction for a plastic bottle blow molding machine which will be accurately centered along the center closing line of the mold so as to relatively decrease wear on the shear steels compared to the wear on the shear steels occasioned by off-center positioning of the blow pin.

It is a still further objective of the present invention to provide such a blow pin construction for a plastic bottle blow molding machine which will prevent the blowing of bottles having webbing (closed holes) in the handles of the blow bottles.

It is a still further objective of the present invention to provide such a blow pin construction for a plastic bottle blow molding machine which will be formed of relatively few parts and welded into a solid unitary member and constructed of hardened tool steel to avoid problems of wear of parts, loss of parts, loosening of nuts and breakage of parts which may occur with blow pins formed by an assembly of a number of parts.

It is a further objective of the present invention to provide such a blow pin construction for a plastic bottle blow molding machine which will decrease the number of bottles which are rejected because they are badly or incompletely blown and to thereby effect a saving in material and in production time.

It is a still further objective of the present invention to provide such a blow pin construction for a plastic bottle blow molding machine which is precision ground so that it produces cleaner bottles for a longer period of time.

BRIEF DESCRIPTION OF THE DRAWINGS

Other objectives of the present invention will be apparent from the following description providing the inventors' best mode of practicing the invention. The description set forth below should be taken in conjunction with the accompanying drawings, in which.

DETAILED DESCRIPTION OF THE INVENTION

Figure 1:
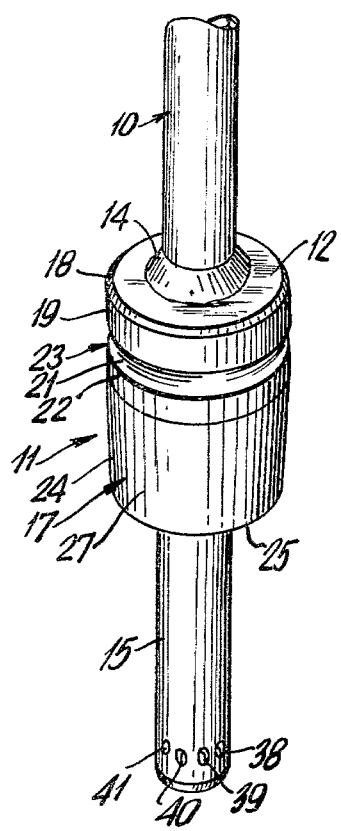
FIG. 1 is a perspective view of the blow pin construction of the present invention.
Figure 2:
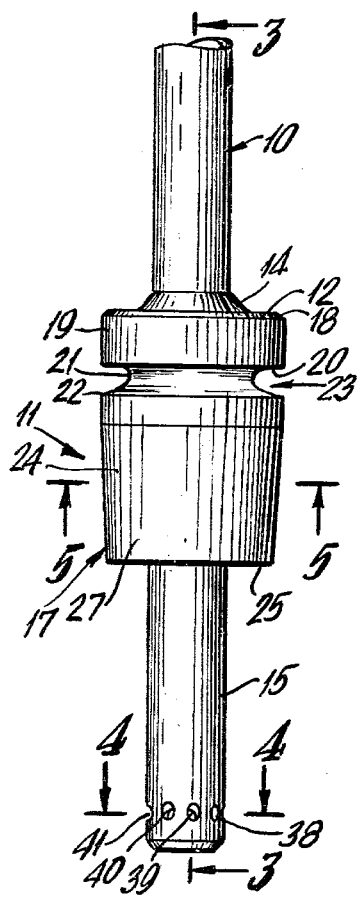
FIG. 2 is a side plan view of the blow pin construction of the present invention.
Figure 3:
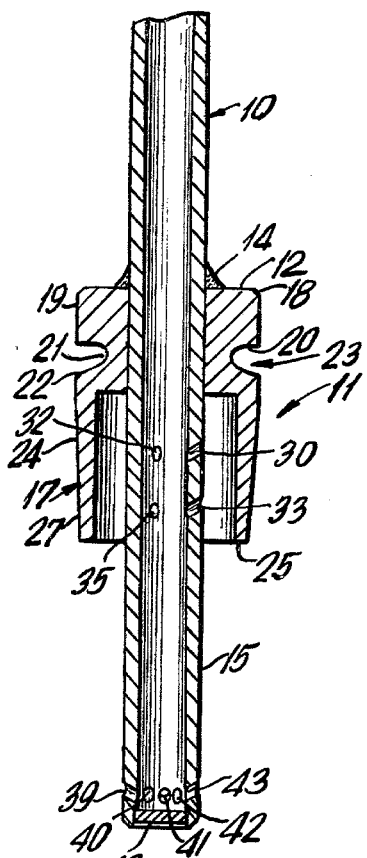
FIG. 3 is a side cross-sectioned view of the blow pin construction showing the blow pin tube centered within the blow pin body.

As shown in FIGS. 1-3, the blow pin of the present invention comprises steel parts which are welded together to form a unitary member. The blow tube 10 is a steel hollow tubular and elongated member, for example, having an internal diameter of 5/16 of an inch and an external diameter of ½ of an inch. The blow pin 11 has a top shoulder portion 12 which forms a round hole 13 through which the blow tube protrudes. The blow tube 10 is welded to the shoulder portion 12 by a circumferential line of welding material 14.

The blow tube extends through the hole and the part beneath the hole is called herein the "blow pin tube" 15. As a matter of manufacturing convenience, and preferably, the blow pin tube 15 and the blow tube 10 are formed from a single internal member, i.e., the blow pin tube 15 is an extension of the blow tube 10. The lower end of the blow pin tube 15 is closed by a plug 16 which is welded or adhered within the tube so as to completely close the lower end of the tube. The blow pin body portion 17 consists of a cylindrical unitary member which preferably is machined from tool steel and heat hardened before it has been welded to the blow tube.

The blow pin body portion 17 has its shoulder portion 12 at its outer edge terminating in a chamfered edge 18 which is contiguous to the seal wall 19. The bottom edge of the seal wall 19 connects to an inwardly directed flange 20 which connects a curved surface 21 which descends to the shearing edge 22. The flange 20 and curved surface 21 form a circumferential channel (groove) 23 which is uniform in depth and positioned in the outer surface of the blow pin body 17. The shearing edge 22 is at the top of the shear wall portion 24 which portion at its lower edge terminates in a horizontal end 25. In general, the body portion of a blow pin is a cylindrical hollow member which is a right cylinder taken along the common axis 26, the hollow cylindrical member forming a skirt 27.

Figure 5:
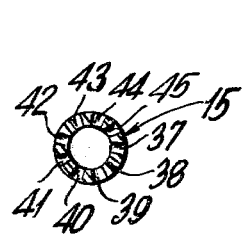
FIG. 5 is a cross-sectioned view of the blow pin construction, taken along line 5—5 of FIG. 2, looking in the direction of the arrows, showing the blow pin tube containing three groups of bores, centered within the blow pin body.
Figure 6:
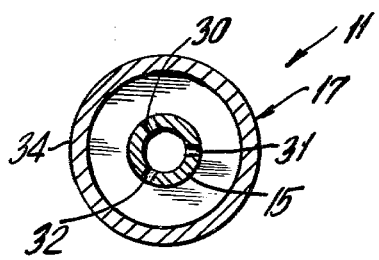
FIG. 6 is an enlarged cross-sectional view, showing the preferable 30° relation of each bore to the common axis of the blow pin tube.
Figure 6:
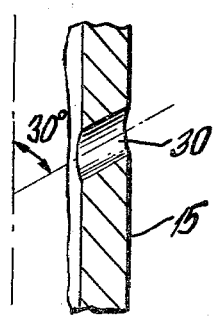

The blow pin tube 15 is centered within the skirt 27 and has bores leading to its internal hollow center so that the expelled compressed air will be directed upwardly within the skirt to cool the shear portion of the blow pin. Preferably there are six such bores 30–35, the six bores being formed into two groups of three bores each, as shown in FIGS. 3 and 5, with each of the three bores being positioned so that one is vertically above the other. Each internal bore is preferably a round hole having its axis at an angle of 30° (an acute angle) to the common axis. This is shown in FIG. 6.

Figure 4:
FIG. 4 is a cross-sectioned view of the lower end of the blow blow pin tube taken along line 4—4 of FIG. 2, looking in the direction of the arrows, showing nine equally spaced bores.

A second group of bores 37–45 is positioned near the lower end of the blow pin tube 15. The center of their openings, i.e., the orifice means, is positioned in the range of between 2.0 and 3.5 inches from the shear portion cutting edge. There are nine bores equally spaced around the axis 26, as shown in FIG. 4, and preferably in the range of 8–12 bores, with each bore upwardly directed. Each of the bores is round in cross-section and the central axis of each bore forms an angle in the range of 25° to 45°, and preferably an angle of 30°, with the common axis, as shown in FIG. 6.

As is shown in applicants' U.S. Pat. No. 4,032,278, the plastic material of the parison fills the space between the inner edge of the seal insert (portion of the mold) and the straight upper rim of the blow pin 11 and seals the top of the parison against internal air pressure. The first blast of low pressure compressed air, for example, 40 pounds per square inch pressure, is then expelled through the blow pin tube 15. Before the molds close, that compressed air causes the parison to expand. A second blast of compressed air, for example, at 80 pounds per square inch pressure, after mold close, will then further expand the parison and cause it to fit closely to the cooled walls of the mold. The parison at its upper end expands against the inner wall of the neck ring. The blow pin is then raised to shear the neck of the formed parison. When the blow pin 11 is raised, the inner edge of the bottom shear insert (portion of the mold) contacts the rim 22 of the blow pin 11 below its groove 23. That contact of the shear rim edge with the blow pin shears (severs) the parison.

The blow pin 11 is then raised, i.e., pulled further upwards (not shown). The portion of the parison above the shear steel is bent back on itself between the seal insert and the bottom ring portion of the blow pin (below the circular rim line) forming waste material. The mold is then opened and the bottle removed by its tail flashing (not shown). The cycle is repeated by lowering the blow pin and again flowing the parison over the blow pin.

What is claimed is:

1. A blow pin for use in a blow molding machine; said blow molding machine forming plastic containers with integral handles by extruding a hot tubular plastic parison around a blow pipe, the blow pipe having a lower free end within a blow mold and the blow mold being closed to form the plastic container from the parison and opened to remove the formed container, the blow pipe at selected times carrying compressed air to expand the parison into the closed blow mold, the blow pin being secured to the blow pipe near the lower free end of said blow pipe and said blow pin being moved to shear the parison after the blow mold is closed;

said blow pin being a right cylindrical member centered on an imaginary axis and having an external wall seal portion which cooperates with a portion of the blow mold to form a seal when the mold is closed, and a tubular portion having a tapered external wall shear portion with a cutting edge which cooperates with a portion of the blow mold to sever the formed parison upon shearing movement of the blow pin; said tubular portion forming a skirt having a bottom edge and spaced from said blow pipe;

characterized in that said blow pin includes a tube means which descends below said skirt bottom edge; said tube means being connected to said blow pipe so that it expels compressed air to cool the blow pin and to expand said parison; a portion of said tube means being positioned within said skirt and having a plurality of orifices to expel air directed at said skirt; said tube means having a plurality of guide orifice means below said skirt portion and adjacent said integral handles to properly form the integral handles, each of said guide orifice means being directed upwardly in the range of 25° to 45° and having their orifice means centers positioned in the range of between 2.0 and 3.5 inches from said shear portion cutting edge.

2. A blow pin as in claim 1 wherein said blow pin tube means is a hollow tubular member which is integral with said blow tube and is straight and centered on the axis of said blow pin.

3. A blow pin as in claim 2 wherein said tubular member is closed at its bottom edge by a plug means to prevent escape of air.

4. A blow pin as in claim 1 wherein said blow pin has an inwardly directed shoulder portion forming a top hole through which the blow pipe protrudes and which shoulder near its inner edge is welded to said blow pipe.

5. A blow pin as in claim 1 wherein said tube means is a hollow tubular member and said guide orifices are each bores through the tube wall.

6. A blow pin as in claim 5 wherein each of said bores is round and uniform in cross-section and centered about an imaginary axis.

7. A blow pin as in claim 6 wherein each bore imaginary axis is at an angle of 25°–45° upwardly directed to the blow pin axis.

8. A blow pin as in claim 7 wherein the exit orifices of said bores lie in a common plane, which plane is perpendicular to the axis of the blow pin.

9. A blow pin as in claim 1 wherein said blow pin has an indented channel between said seal portion and said cutting edge.

* * * * *